C. STREIT.
Rocking-Chair.

No. 9,046. Reissued Jan. 13, 1880.

Attest
Charles F. Gessert
L. C. Brinkman

Inventor
Charles Streit
By Geo. J. Murray
Atty.

N. PETERS, PHOTO-LITHOGRAPHER, WASHINGTON, D. C.

UNITED STATES PATENT OFFICE.

CHARLES STREIT, OF CINCINNATI, OHIO.

ROCKING-CHAIR.

SPECIFICATION forming part of Reissued Letters Patent No. 9,046, dated January 13, 1880.

Original No. 158,869, dated January 19, 1875. Application for Reissue filed October 20, 1879.

*To all whom it may concern:*

Be it known that I, CHARLES STREIT, of Cincinnati, Hamilton county, State of Ohio, have invented certain new and useful Improvements in Rocking-Chairs, of which the following is a specification.

My invention relates to a class of chairs, cribs, &c., made to vibrate on rockers resting on a platform.

The invention consists in attaching the rocking member to the platform by means of an elastic retaining-brace secured to the platform and connected to the rocking frame by horizontal pivots, so that the rocking frame may freely vibrate, while at the same time it will be prevented from slipping and turning upon the platform.

It consists, also, in so swiveling a flexible metal retaining-brace to the chair as to permit the chair to vibrate without fretting the spring-brace.

It further consists of a means of securing the flexible metal retaining-brace to the platform upon which the rockers rest and vibrate, consisting of elastic or yielding bearings, between which the spring-brace passes, and which are secured, with the spring-brace, to the platform.

It also consists of hinged leaves upon the ends of the springs swiveling upon bolts in the rockers.

It also consists in securing a flat metal retaining-brace centrally upon the platform, and securing its upturned ends to the inner sides of the rockers at some distance above the platform, so that the brace may yield when the rockers are in motion. I thus avoid slotting the ends of the spring through which the bolts pass into the rockers, and hence avoid scraping and noise when the rockers are in motion.

It finally consists in a safety rod or stop arranged above the brace so as to overhang it from the center in each direction and prevent it from vibrating too far.

Figure 1:
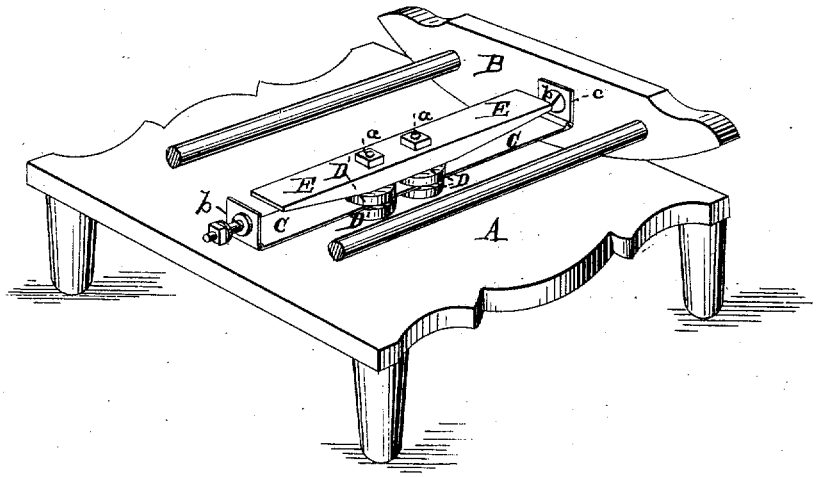
Figure 2:
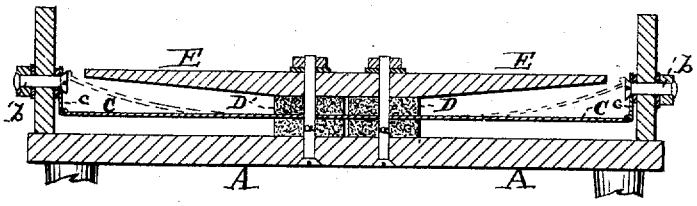

Figure 1 is a perspective view of my improvement. Fig. 2 is a section through the same.

A is the platform upon which rests the chair-rocker frame B. C is the flexible metal retaining-brace, which is secured to the rocker-frame B by means of bolts *b* passing through the hinged leaves *c c* and bolted loosely to the rockers, so as to allow said leaves to swivel. D D′ are elastic bearings, in which the brace C rests, and which are secured, with the brace, to the platform by means of bolts *a a′*. Resting over and secured to the bearings D D′ is a safety-rod, E, to prevent the brace from vibrating too far and to relieve the brace from strain should the chair be lifted. This safety-rod extends from the point where it is secured in each direction to overhang the brace and give it a long bearing when the chair is lifted by the rocking frame. As the rocker-frame, when in motion, carries the bolts *b b* alternately forward and back of the vertical center of brace C, (which is their normal position when the rocker-frame is at rest,) the retaining-brace is subjected to a torsional strain. In order to avoid fretting or snapping the spring I have provided the elastic bearings D D′, which permit the brace to turn or have a rocking motion coincident with the motion of the rocking frame. It is also evident that in rocking the spring is subjected to a tensile strain, as the points connected to the rocking frame must rise and fall with it, thus alternately increasing and shortening the distance between the central connection of the brace to the platform and its end connections to the rockers. To avoid fretting or snapping the spring under this strain I have provided the hinged leaves *c c* upon each end, which permit the elbows of the brace to work freely without the slightest danger of being fractured.

It will thus be seen that by my invention the rocker-frame is retained at all times in proper position upon its platform without additional guides, while it is permitted to freely rock without undue strain or friction.

The spring, as shown, is applied to a rocking-chair; but when applied to a child's crib, the distance between the rockers being much greater, I use two retaining-springs, C, having separate bearings D D′ and separate stops E, to prevent the springs from vibrating too far.

I claim—

1. The platform A and rocker-frame B, in combination with an elastic retaining-brace, as C, said brace passing transversely across the platform, secured centrally thereto, and having its ends connected by horizontal pivots with the rocking frame, substantially as described.

2. The combination, substantially as specified, of platform A, rocker-frame B, spring retaining-brace C, and bolts *b*, said brace being secured to the platform and swiveled upon said bolts in the rockers.

3. The platform A and rocker-frame B, in combination with the elastic bearings D D′ and brace or braces C, as specified.

4. The platform A and rocker-frame B, in combination with the brace or braces C, which are centrally connected to the platform, and hinged leaves *c c*, substantially as specified.

5. The combination, substantially as hereinbefore set forth, of platform A, rocker-frame B, and a flexible metal retaining-brace, as C, said brace being centrally secured to the platform, and having upturned ends, which are connected to the inside of the rockers.

6. In combination, the platform A, rocker-frame B, retaining-brace C, and stop E, said stop being secured above the brace C to longitudinally overhang the brace in each direction from the center, so as to protect said brace when the frame is lifted, and prevent said frame from vibrating too far, substantially as specified.

7. The combination, substantially as specified, of a rocking frame made to vibrate upon a platform, and the platform upon which it rests and vibrates, with a flexible metal retaining-brace, as C, arranged transversely between the rockers, and secured to while elevated above the platform, and connected to the rocker-frame, substantially as specified.

CHARLES STREIT.

Witnesses:
GEO. J. MURRAY,
M. W. OLIVER.